Feb. 13, 1968 R. E. SZONN 3,368,806
GRADUATED PRESSURE SPRING ELEMENT MADE OF ELASTOMER MATERIAL
Filed Oct. 23, 1965
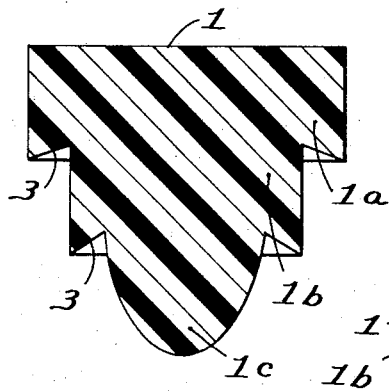
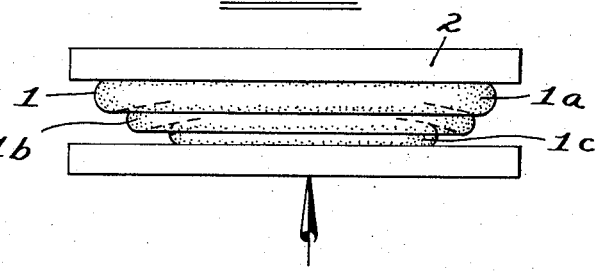
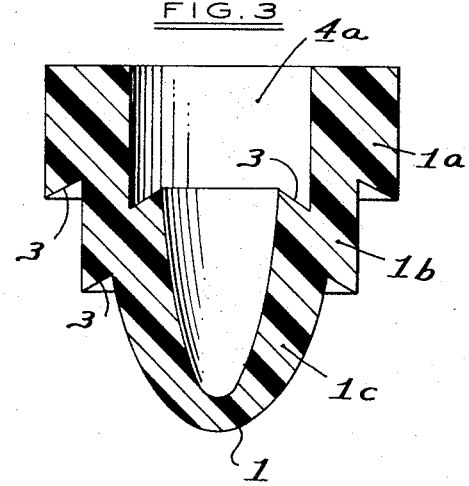
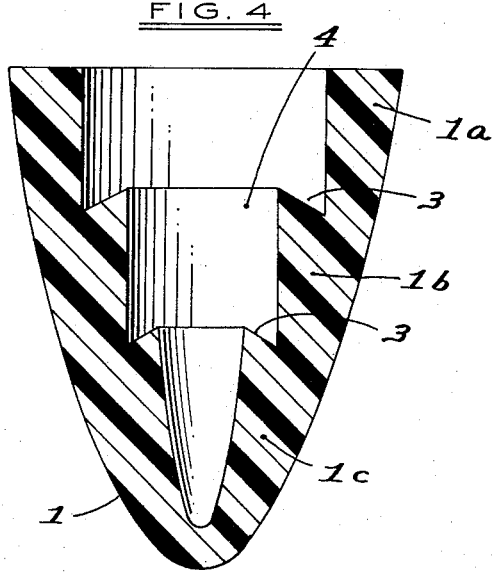
INVENTOR.
REINHOLD E. SZONN
BY
Barnes, Kisselle, Raisch & Choate
ATTORNEYS United States Patent Office 3,368,806
Patented Feb. 13, 1968

3,368,806
GRADUATED PRESSURE SPRING ELEMENT
MADE OF ELASTOMER MATERIAL
Reinhold E. Szonn, Lemforde, Germany, assignor to
Cellasto Incorporated, Ann Arbor, Mich., a corporation
of Michigan
Filed Oct. 23, 1965, Ser. No. 502,877
Claims priority, application Germany, Feb. 19, 1965,
L 50,001
5 Claims. (Cl. 267—1)

ABSTRACT OF THE DISCLOSURE

A graduated pressure spring element made of elastomer material, particularly a cellular elastic material, having a wall design wherein pressure from the nose of a dome-shaped element will cause a telescoping of the parts from the nose end toward the base and a mutual reinforcement of the respective walls as the pressure from the nose increases toward the base, this design consisting primarily of step-like formations in the walls of the device to provide flat annular wall sections terminating at wall sections extending generally in the direction of the axis of the device.

---

This invention relates to a graduated pressure spring element made of elastomer material, particularly a cellular-elastic polyurethane plastic.

It is a known practice to provide such elastic elements with peripheral constructions or grooves in the region where buckling zones arise when the spring is compressed in order to form fixed buckling points. In this way, an effort is made to arrive at a spring characteristic which is as free of buckling as possible. For this purpose, other known elastic elements of the type mentioned have been fashioned with a graduated shape. These elastic bodies are subdivided into individual sections of different circumference, arranged in series, and the individual sections are so disposed in sequence that a graduated tapering of the elastic body, progressing oppositely to the direction of impact, results.

It has now been found that the formation of the fixed buckling points is a matter of great importance, and that by a corresponding ingenious design of these buckling points a further improvement can be made in the elastic spring element, particularly with reference to its elastic behavior.

Accordingly, the pressure spring element according to the invention is so fashioned that radially extending step-like surfaces of the elastic element, inclined inwardly in the direction of impact pass from the peripheral surface of each graduated section to that of the next.

A further feature of the invention consists in that a graduated cavity is provided within the elastic element, with surfaces which likewise are inclined inwardly in the direction of impact.

As a further refinement of the invention, the elastic element is also so fashioned that the portion of the cavity located in the large end section of the elastic element extends into the adjoining section of smaller periphery so that the inner and outer peripheral surfaces of the elastic element overlap.

By fashioning the fixed buckling points according to the invention, the resulting effect is that when the elastic element is subjected to load the individual graduated sections tend to telescope so that a telescopic action of the graduated sections with one another is achieved, incipience of which results essentially from the lower material strength in the region of the step-like surfaces which are inclined inwardly in the direction of impact. In this manner the directional stability of the elastic element is greatly enhanced, and on the other hand an even better opportunity is provided to fit such an elastic element to the particular spring characteristic desired. The danger of buckling is practically eliminated in the elastic element according to the invention.

Other objects and features of the invention relating to details of construction and operation will be apparent in the following description and claims.

Drawings accompany the disclosure and the various views thereof may be briefly described as:

FIGURE 1, a longitudinal section of a solid elastic element.

FIGURE 2, an elastic element of FIGURE 1 in the compressed condition.

FIGURE 3, a modified structure utilizing the hollow cross section.

FIGURE 4, a modified structure using a hollow cross section with internal grooves only.

Referring to the drawings:

The elastic element is designated by 1. This element preferably consists of a polyurethane plastic with a cellular structure which has been found to be exceptionally suitable for the absorption of strong impact forces with reference to elastic behavior and the tensile strength or tear resistance of elastic elements made of such a plastic. The elastic element 1 is subdivided into several coherent sections 1a, 1b and 1c, the diameter or circumference of which becomes smaller in the direction opposite to that of impact so that, with reference to the striking surface, there is a graduated tapering of the elastic element. The lower graduated section 1c can be equipped with a metal plate 2 in the usual manner in order to provide secure means of attachment.

In the sense of the invention, the upper surfaces 3 of the step-like sections 1a, 1b, 1c of the elastic element are inclined inwardly in the direction of impact. While in the solid elastic element, according to FIGURE 1, the step-like surfaces 3 are provided only on the outer periphery, the embodiments according to FIGURES 3 and 4 offering the possibility of also fashioning the cavity 4 stepwise and, again in the sense of the invention, likewise inclining the resulting upper step-like surfaces 3 inwardly in the direction of impact. In this way elastic elements can be made which have only external inclined step-like surfaces (FIGURE 1), or in which the inclined surfaces 3 are provided only on the inner periphery of a hollow graduated element, FIGURE 4.

On the other hand, there is a possibility with a hollow elastic element of providing inwardly inclined step-like surfaces (FIGURE 3) both on the inner and on the outer periphery of the elastic element. In this case, it is expedient so to fashion the graduated sections that their peripheral surfaces overlap, perhaps in such a way that the surfaces 3 of the portion 4a of the cavity which is situated in section 1a of the elastic element lie in the region of the adjoining graduated section 1b.

I claim:

1. A graduated pressure spring formed as a one-piece integral molding of an elastomer material which comprises a generally dome-shaped body increasing in diameter from a base portion to a nose portion, a wall of said body having a plurality of annular steps decreasing progressively in diameter from the nose to the base and terminating at thickened portions of said wall adjacent narrowed portions of said wall, the outer periphery of said annular steps terminating at a wall of said body extending generally in the direction of the axis of said dome, wherein pressure on the nose portion effects an inclination of each step in section from an outside diameter to an inside diameter toward the base portion to effect mutual support of portions of the walls as the body compresses.

2. A graduated pressure spring as defined in claim 1 in which said dome is hollow and said steps are formed on the interior wall.

3. A graduated pressure spring as defined in claim 1 in which said dome is hollow and said steps are formed on the interior and exterior walls.

4. A graduated pressure spring as defined in claim 1 in which said dome is hollow and the steps are formed on the interior surface, the walls of said dome increasing in thickness from said nose portion of said dome to each step.

5. In a graduated pressure spring element having a generally dome-shaped body with a plurality of annular elements with varying circumferences made of an elastomer material, that improvement which comprises a plurality of annular flat surface areas interposed between and integral with the annular elements of the body, the surfaces being inclined toward the bottom of the dome, the outer periphery of each step terminating a wall portion of said body extending generally in the direction of the axis of said body, wherein pressure on said dome tends to increase the inclination of said surfaces to effect compacting and mutual support of said elements as said dome is compressed.

References Cited
UNITED STATES PATENTS

| | | | |
|---|---|---|---|
| 1,571,713 | 2/1926 | Emery | 267—63 |
| 3,118,659 | 1/1964 | Paulsen | 267—63 |

ARTHUR L. LA POINT, *Primary Examiner.*

R. M. WOHLFARTH, *Assistant Examiner.*